(12) United States Patent
Nacke et al.

(10) Patent No.: US 9,963,841 B2
(45) Date of Patent: *May 8, 2018

(54) CONSTRUCTION MACHINE, PARTICULARLY ROAD MILLING MACHINE, AND METHOD FOR COMPENSATING FOR GROUND UNEVENNESS FOR SUCH A CONSTRUCTION MACHINE

(71) Applicant: BOMAG GmbH, Boppard (DE)

(72) Inventors: Andreas Nacke, Dessighofen (DE); Marco Reuter, Emmelshausen (DE); Andre Hoffmann, Gondershausen (DE)

(73) Assignee: BOMAG GmbH, Boppard (DE)

( * ) Notice: Subject to any disclaimer, the term of this patent is extended or adjusted under 35 U.S.C. 154(b) by 231 days.

This patent is subject to a terminal disclaimer.

(21) Appl. No.: 14/972,131

(22) Filed: Dec. 17, 2015

(65) Prior Publication Data
US 2016/0177522 A1 Jun. 23, 2016

(30) Foreign Application Priority Data

Dec. 19, 2014 (DE) .......... 10 2014 019 168

(51) Int. Cl.
*E01C 23/088* (2006.01)
*B60G 17/016* (2006.01)

(52) U.S. Cl.
CPC .......... *E01C 23/088* (2013.01); *B60G 17/016* (2013.01); *B60G 2202/413* (2013.01); *B60G 2300/09* (2013.01); *B60G 2400/0512* (2013.01); *B60G 2400/61* (2013.01); *B60G 2400/90* (2013.01); *B60G 2500/30* (2013.01); *B60G 2800/014* (2013.01)

(58) Field of Classification Search
CPC .......... B60G 17/0162; B60G 2400/252; B60G 2800/912; B60G 2800/012; B60G 2800/0124; B60G 2500/30; B60S 9/12; E01C 23/088; E01C 23/127
See application file for complete search history.

(56) References Cited

U.S. PATENT DOCUMENTS 4,830,397 A     5/1989 Watanabe et al.
5,318,378 A *   6/1994 Lent .................. E01C 23/088
                                              404/75
(Continued)

FOREIGN PATENT DOCUMENTS

DE      3783557 T2     5/1993
DE      10337600 A1    3/2005
(Continued)

*Primary Examiner* — John J Kreck
(74) *Attorney, Agent, or Firm* — Wood Herron & Evans LLP

(57) ABSTRACT

The present invention relates to a construction machine, in particular a ground milling machine, comprising transportation means connected to the machine frame via lifting columns. The lift adjustment of the lifting columns occurs as a function of the determined weight force values respectively applied to at least one actuator of a pair of front and/or rear and/or right and/or left transportation means. The present invention further relates to a method of optimum and practical weight distribution of the machine weight to the transportation devices for such a construction machine.

14 Claims, 5 Drawing Sheets

(56) References Cited

U.S. PATENT DOCUMENTS

| | | |
|---|---|---|
| 7,059,127 B2 | 6/2006 | Bauer et al. |
| 7,946,788 B2 * | 5/2011 | Jurasz ............... E01C 23/088 404/83 |
| 8,818,699 B2 * | 8/2014 | Nichols ............. B62D 53/021 280/400 |
| 9,133,586 B2 * | 9/2015 | Reuter ............... E01C 23/088 |
| 2012/0179339 A1 | 7/2012 | Busley et al. |
| 2013/0151075 A1 * | 6/2013 | Moshchuk ......... B60G 17/016 701/38 |
| 2014/0379227 A1 | 12/2014 | Reuter et al. |
| 2015/0137577 A1 | 5/2015 | Beming et al. |

FOREIGN PATENT DOCUMENTS

| | | |
|---|---|---|
| DE | 102005044211 A1 | 3/2007 |
| DE | 69931098 T2 | 4/2007 |
| DE | 102006062129 A1 | 7/2008 |
| DE | 102013010298 A1 | 12/2014 |
| EP | 0940274 B1 | 9/1999 |
| WO | 03064770 A1 | 8/2003 |

\* cited by examiner

CONSTRUCTION MACHINE, PARTICULARLY ROAD MILLING MACHINE, AND METHOD FOR COMPENSATING FOR GROUND UNEVENNESS FOR SUCH A CONSTRUCTION MACHINE

CROSS-REFERENCE TO RELATED APPLICATIONS

The present application claims priority under 35 U.S.C. § 119 of German Patent Application No. 10 2014 019 168.0, filed Dec. 19, 2014, the disclosure of which is hereby incorporated herein by reference in its entirety.

FIELD OF THE INVENTION

The present invention relates to a construction machine, in particular a road milling machine, and to a method for compensating for ground unevenness for a construction machine, in particular a road milling machine.

BACKGROUND OF THE INVENTION

Generic construction machines, in particular road milling machines, are disclosed, for example, in DE 10 2006 062 129 A1, DE 10 2005 044 211 A1, DE 103 37 600 A1, and WO 03/064770 A1. Such road milling machines are used for milling the ground, for example, for milling road surfaces and/or for carrying out stabilizing and/or recycling measures for the ground and comprise for this purpose a milling device having a milling drum mounted with its axis of rotation extending horizontally and transversely to the direction of advance and adapted to mill the ground during rotational working operation by means of appropriate working tools disposed on the cylindrical outside jacket surface of the milling drum. Apart from the milling device, such a road milling machine also comprises a machine frame that constitutes the essential supporting structure of the construction machine. Furthermore, a pair of front transportation means and a pair of rear transportation means are usually disposed on the machine frame, wherein, in the present case, the term "transportation means" is understood to mean wheels or crawler tracks. However, a single pair of the transportation means may fundamentally also be substituted by a single transportation means in known manner.

For the purpose of enabling various vertical positions of the machine frame in relation to the ground, at least one pair of the front and/or rear transportation means is connected to the machine frame by means of lifting columns each of which comprises an actuator. In this regard, the lifting columns are constructed in such a way that they can alter the distance between the machine frame and the transportation means, in particular at least partly in a vertical direction, for the purpose of effecting lift adjustment of the machine frame in vertical direction relative to the ground. The actuators are in particular linear actuators and are arranged in particular in such a way that linear adjustment in vertical direction is possible. Furthermore, generic construction machines comprise a control device designed to control the lift adjustment of the lifting columns by means of the actuators. In this regard, the main function of the control device lies in particular in facilitating the coordinated adjustment of the actuators toward each other for the purpose of facilitating the regulation, on the one hand, of the height adjustment of the construction machine itself and, on the other hand, for adjusting the position of the machine frame in relation to the ground.

A particularly challenging problem to be solved, especially in connection with generic road milling machines, relates, on the one hand, to accomplishing uniform operating results, for example, as regards the milling depth, and, on the other hand, to ensuring adequate tipping resistance of the ground milling machine for the purpose of guaranteeing safe working and transport conditions. This is particularly problematic in the case of ground unevenness and/or when traveling over obstructions, for example, when traveling over a milled edge. Due to the relatively high center of gravity of such construction machines, they feature a relatively high tendency to tip over as soon as the machine assumes a slightly tipped position.

SUMMARY OF THE INVENTION

It is thus an object of the present invention to provide an approach for enabling the tipping resistance of a generic construction machine on uneven ground as reliably and safely as possible.

According to one aspect of the present invention, provision is made for a weight force measuring device to be allocated to at least one actuator of a pair of front or rear transportation means, with such weight force measuring device being designed to ascertain the value of a weight force applied to the at least one actuator. Thus, it is of primary importance that the transportation means under consideration be regarded in pairs, of which one pair respectively consists of a transportation means disposed on the right-hand side and a transportation means disposed on the left-hand side of the machine or of a transportation means disposed on a front side and a transportation means disposed on a rear side. The terms "front" and "rear" relate to the forward direction of the construction machine, signifying that the front transportation means are disposed in the forward direction on the front half of the machine frame and the rear transportation means are disposed on the rear half of the machine frame. The term "actuator" describes generally the device adjusting the degree of lift provided by the lifting columns. More detailed description as regards specific exemplary embodiments of the actuators are made below. The term "weight force measuring device" describes in general a device by means of which the weight force applied to the actuator at any one time can be measured and is in fact measured. In this regard, it is essential for the weight force of the construction machine to be applied to the transportation means and to be deflected, at least in part, into the ground via the lifting columns. The weight force measuring device now makes it possible to measure, and monitor over time, the weight force that is applied to the respective actuator. In this regard, the weight force can basically be measured at any point on the actuator at which the applied weight force is dependent, at least in part, on the weight force distribution of the construction machine on the transportation means. The weight force measuring device thus enables determining directly and immediately the weight force or at least a weight force value applied to the respective actuator.

The height adjustment of the lifting columns is powered by means of an appropriate drive device. Such device consequently supplies the driving energy required for adjustment of the lifting columns. In particular, such a drive device can consist of, say, one or more servomotors or, for example, of one or more hydraulic pumps. According to one aspect of the present invention, the drive device is constructed in such a manner that it allows for independent activation of the relevant actuators for the purpose of enabling individual adjustment of the actuators of at least one pair of transportation means.

According to the present invention, the control device is designed in such a manner that it controls the set position of the actuators of the respective pair according to the weight force values obtained by the weight force measuring device. Thus, the control device is designed, on the one hand, in such a manner that the weight force values of the at least one actuator obtained by means of the at least one weight force measuring device and registered continuously or at least at predefined intervals are transmitted to said control device, where they are evaluated. Furthermore, the control device is, at the same time, the device that is directly or indirectly responsible for the control of the actuators. Consequently, the control device controls, for example, the drive device for the purpose of individual propulsion of the actuators of the lifting columns. The drive device encompasses all elements that are responsible for the adjustment motion of the lifting column. Apart from a motor, for example, an electric motor, or a hydraulic pump, this may also comprise pipe systems and, in particular, controllable flow control valves and shut-off valves of a hydraulic system and/or switches of an electronic control system.

An important concept of the present invention is the realization that the weight force value applied to the at least one actuator of a pair of front and/or rear transportation means essentially depends on the degree of tilt of the construction machine and thus on the weight force distribution of the construction machine to the actuators of the front and/or rear and/or right and/or left transportation means. For example, in the event of the construction machine being in a position tipped to the right in relation to a basically horizontal starting position of the machine frame as regarded in the direction of advance, or as regarded in the forward direction, the proportion of weight force applied to the right-hand transportation means will increase and the proportion of weight force applied to the left-hand transportation means will decrease. Dependent on the extent of tip or in particular on the degree of increase or decrease of the weight force of the construction machine as applied to the respective transportation means, the weight force values registered by the weight force measuring device at the at least one actuator of a pair of front or rear or right or left transportation means also increase or decrease. To summarize, it may be stated that the present invention is based upon the realization that the weight force values monitored at the above positions represent a gauge for the position of the center of mass and thus the degree of tip of the construction machine. For the purpose of ensuring an optimum and practical distribution of weight of the machine weight to the transportation means and for the purpose of achieving stable balancing of the construction machine to prevent tilting from occurring even when the ground is uneven, as is the case, for example, when driving over obstructions, in particular over milled edges, provision is now made according to the present invention for the control device to be constructed in such a manner that, starting from a setpoint position of the machine frame in which a setpoint weight force value prevails, it controls the two actuators independently of each other when weight force changes occur during the travelling operation and approaches the actual weight force value in the direction of the setpoint weight force value by means of a lift adjustment. In this regard, the actual weight force value represents the weight force value currently registered by the weight force measuring device, and the setpoint weight force value consequently represents the target weight force value toward which the control device approaches and in particular adjusts the actual weight force value by way of lift adjustment of the actuators.

The setpoint position of the machine frame defines an optimum and practical weight distribution of the machine weight to the transportation means as well as a stable starting position of the machine frame, in particular a horizontal arrangement of the machine frame, in particular such that the center of gravity of the construction machine lies as centrally as possible in the horizontal plane, especially at least in relation to the two longitudinal sides of the construction machine. In the setpoint position of the machine frame, a setpoint weight force is applied to the at least one actuator. In this regard, the setpoint position can be chosen such that the weight force applied to the two front and/or to the two rear and/or to the two right and/or to the two left transportation means of a pair is distributed evenly, but this is not mandatory. Consequently, the setpoint weight force value thus constitutes the reference value for the control device, in the direction to which reference value the control device controls the adjustment of the actuators for the purpose of adjusting the lift of the lifting columns when weight force changes occur on the at least one actuator. In the event of weight force changes occurring, i.e., in the form of deviations from the setpoint weight force value, and being registered by the weight force measuring device, the control device controls the settings of the two actuators of a pair of the front and/or rear and/or right and/or left transportation means. As an addition or alternative, the weight force distribution from the weight force values may serve as a reference. This means that, upon activation of the actuator of the lifting column of the one pair on the right-hand side, the control device will preferably simultaneously and ideally to approximately the same extent retract the lifting column or the actuator on the left-hand side of said pair and vice versa. Consequently, the adjustment of the lifting columns of a pair is carried out conversely to each other. It is essential in this respect that the control device activates the two actuators of a pair independently of, and isolated from, each other for the purpose of achieving, in this case, an electronic pendular function of said pair. In this regard, the control device controls the lift adjustment of the actuators such that it approaches the actual weight force value in the direction of the setpoint weight force value and, particularly preferably, adjusts it to the setpoint weight force value when weight force changes occur. Consequently, the control device continues its lift adjustment of the actuators such that the effects of the change in the lift adjustment on the actual weight force value result in the actual weight force value moving in the direction of the setpoint weight force value. This consequently indicates, in particular, the direction of the adjusting movement. In this way, due to the fact that the weight force value on the at least one actuator is dependent on the degree of tilt of the construction machine, there is obtained, according to one aspect of the present invention, optimum and practical weight distribution of the machine weight to the transportation devices as well as efficient and reliable leveling of the tipping motion of the construction machine, which has a stabilizing effect on the construction machine. This makes it possible to dispense with hydraulic coupling, as the resulting pendular function is effected via the control device by way of individual and independent activation of the two actuators particularly by electronic means.

It is possible with regard to each pair of transportation means that the weight force applied to the actuator is registered only on one transportation means or, in particular, only on the actuator of said one transportation means, and is implemented by the control device for the purpose of controlling the actuators. It is, however, ideal for the control device to register and monitor the weight force and in particular also the weight force profiles during the traveling operation of the construction machine to both sides of the pair of transportation means and consequently individually to the two actuators of a pair of transportation means. It is further preferable, particularly in the case of ground milling machines, for each of the transportation means of the overall transportation unit to be separately connected to the machine frame by means of a lifting column having an actuator, and that the control device controls each of the actuators separately. Consequently, according to one embodiment, the control device is capable of controlling at least three and in particular four lifting columns individually and independently of each other for effecting lift adjustments. It is basically possible, for example, for height adjustment of the construction machine, for example, for leveling purposes, for use to be made of a different type of control of the actuators of the lifting columns, for example, adjustment not in different directions but in the same direction. For the purpose of pendular function, however, provision is made, in particular, for a converse adjustment.

A functional feature of the actuators is the fact that they enable lift adjustments of the lifting columns to be carried out, particularly in the vertical direction. Particularly, suitable for this purpose are screw-driven elevators and, in particular, hydraulic cylinders, for example. In the latter case, the construction machine appropriately comprises a hydraulic supply system preferably comprising a hydraulic pump, by means of which the propulsion energy required for the lift adjustment is applied, in which case it is basically also possible to provide multiple hydraulic pumps, for example, optionally individually allocated to a respective actuator or a pair of actuators. Ideally, for each lifting column or, in particular, for each hydraulic cylinder of one pair or, in particular, of both pairs of front and/or rear transportation means respectively, at least one valve is present that is independently controllable by means of the control device for hydraulic fluid inlet and outlet. The lift adjustment control of the lifting columns consequently takes place by opening and closing of appropriate hydraulic valves by means of the control device. According to the present invention, provision is made in this embodiment for each hydraulic cylinder to be associated, in particular, with a weight force measuring device for the purpose of registering the weight force applied to the hydraulic cylinder. In this embodiment, the weight force profile is consequently utilized as indication of the position of the center of mass of the construction machine.

Basically, the hydraulic cylinders used can be working cylinders acting in one direction only. However, to enable an adjustment movement of the hydraulic cylinders in both directions as far as possible at a highly precise and reliable level, the hydraulic cylinders used as actuators are preferably working cylinders that act in both directions. Such hydraulic cylinders are characterized by the fact that they can be subjected to the force of hydraulic fluid on both opposing surfaces of the hydraulic piston, in which case a specific distinction is made between a piston side and a rod side with reference to the cylinder chambers. In this respect, the rod side is the side on which the piston rod of the cylindrical piston extends within the hydraulic cylinder. At this point, an annular chamber is present in the internal space of the hydraulic cylinder for the purpose of receiving the hydraulic fluid. The piston side defines the side that faces away from the rod side. On this side, the hydraulic chamber is designed in the form of a cylindrical chamber.

The weight force measuring device typically includes at least one weight force sensor configured for direct or indirect determination of the weight force. Such a weight force sensor may for example be a suitable force sensor, in particular a load cell. In practice, strain gauges and/or piezoelectric sensors are very preferably taken into consideration. Said sensors are particularly characterized by a small installation space and high functional reliability.

The positioning of the at least one weight force sensor is effected at a location at which a weight force value being applied to a transportation means or at least a partial weight force distribution can be determined. To that end, particularly the entire region between the machine frame and the respective transportation means, particularly mounting brackets and very particularly the actuator may be taken into consideration. Preferred arrangement positions of the respective weight force sensor are the regions above or below the actuator, particularly the lifting column, for example. Specifically, this may be a region between a lifting column base and the transportation means, in particular a frame or chassis thereof, as an example of an arrangement below the actuator, or the region between the machine frame or particularly a bearing sleeve partially surrounding a lifting column of the actuator and the head region of the lifting column. Said arrangement positions shall be considered merely as examples. It is essential for the arrangement of the weight force sensor that said sensor is positioned at one location, that it may detect a weight force value and that it particularly may also detect weight force value changes or changes in the weight force distribution and that it can quantify said changes at least to a certain extent.

As described above, it is basically sufficient, within the scope of the present invention, when a weight force value is monitored only on one side of the respective pair of transportation means in the appropriate manner, and is used for the control of the leveling function of the pair of transportation means by means of a setpoint weight force value. However, weight force changes may occur during operation of the machine that are not attributable to tipping of the construction machine. One such change may, for example, be weight loss due to the consumption of fuel and/or water, caused by the milling drum engaging with the ground at the commencement of, and during, operation and/or a position change of the at least one material conveyor device, etc. It is further preferred, particularly for these reasons, that the control device is designed in such a way that it measures a relative weight force value between the two sides of the respective pair of transportation means and uses this as a basis for the control of the actuators of the pair of transportation means. In this preferred refinement, the control device is consequently constructed in such a way that, with the machine frame being in the setpoint position in relation to a pair of transportation means, it calculates a setpoint weight force value for each actuator and from this a setpoint weight force value quotient and controls the two actuators independently of each other in the case of weight force changes occurring during operation, and triggers these actuators from an actual weight force value quotient in the direction of the setpoint weight force value quotient by means of a lift adjustment of the actuators. An essential advantage of this embodiment consequently lies in the fact that the control device adjusts the lift adjustment of the actuators of the pair of front and/or rear transportation means by means of its weight force value ratio. Consequently, as an example, weight force changes relating to the two actuators, for example, due to fuel consumption, are equalized, at least approximately.

The above-described weight force measuring devices are preferably part of a comprehensive sensor system of the construction machine, registering further information regarding position and/or status and conveying such information to the control device. This particularly applies to the presence of a filling level sensor for the fuel tank, permitting inference on the weight change of the construction machine depending on the amount of fuel currently available. In that case, corresponding changes in the weight force distribution can also be taken into consideration by the control device. Additionally, or alternatively, a filling level sensor for the water tank is provided, likewise making it possible to determine the amount of water currently present therein. Furthermore, the sensor system can, additionally or alternatively, finally also comprise, for example, a tilt sensor, for example, for measuring the degree of tilt of the machine frame along the longitudinal axis or the transverse axis of the construction machine and/or for assessing and monitoring the position of the milling drum. Of course, the sensor system can be enhanced by means of additional sensors, for example, for ascertaining the direction of travel, the speed of travel, the mode of operation (driving or working), etc. This particularly also applies, for example, to a sensor device when utilizing a working platform or driver's cabin movable relatively to the machine frame, by means of which sensor device the position of the working platform or of the driver's cabin can be determined and monitored to hereby offset any shifts in the center of gravity and thus, if necessary, any changes in weight force in the individual lifting columns. It is essential for the control device to be appropriately connected to the sensor system for the purpose of accessing the sensor data thus determined.

Consequently, the primary function of the present system comprising the design of the construction machine having a control device relates to the achievement of tipping stability for the construction machine, particularly when the construction machine is configured as a ground milling machine, in particular a road milling machine, and/or to ensure contact with the ground for all transportation means present. Various levels of vertical positioning of the machine frame, particularly in the case of ground milling machines, are however often required, for example, for setting the milling depth. In this respect, the determination of the milling depth usually takes place by means of a leveling system furthermore designed in such manner that it ensures adherence to the required milling depth throughout the milling operation. To this end, the ground milling machine according to one embodiment of the present invention preferably comprises a device for the determination of the vertical level of the construction machine in the setpoint position. In other words, such device detects the distance of a reference point, for example, a point on the machine frame, in a direction perpendicular to the ground and/or it detects the depth of engagement of the milling drum into the ground. The vertical position of one or more lifting columns determined by means of this device can basically also be observed by the control device of the present invention for the surveillance and control of the tipping stability.

In this respect it is further possible, for example, to design the control device in such a way that triggering of an adjustment of the actuators of a pair of transportation means only takes place when determined threshold values have been exceeded or have not been reached, for example, with reference to the actual weight force value. In this way, a certain tolerance range is created, within which a counter-regulation by means of the control device does not yet take place. Additionally, or alternatively, maximum adjustment levels not to be exceeded by the adjustment movements triggered by the control device can be set for the actuators. In this way, actuator components can, for example, be prevented from hitting against each other and thus possibly being damaged, for example. Of course, the control device can additionally be designed in such a way that it comprises an input device for determining and entering the threshold values and/or maximum values. This makes it possible to adapt the settings to the individual conditions. This may be of relevance, for example, when the construction machine is to be used in a sloping starting position, as may be the case when working on sloping terrain, etc.

A particular challenge for the driver of a ground milling machine presents itself on commencement of the milling operation when the milling drum engages the ground for the purpose of milling it to the setpoint depth. The control device according to the present invention is preferably designed so as to control an automatic milling starter. Such an automatic milling starter is characterized by the fact that a lowering of the ground milling machine with the milling drum in operation is automatically coordinated by the control device up to the point at which the setpoint milling depth has been reached. This can, in particular, involve smooth lowering of the two lifting columns of a pair of transportation means at a predefined lowering rate, also, in particular, with respect to the particular milling drum in use and/or to the ground material and/or to the selected speed of rotation of the milling drum. This thus ensures, for example, that soil material is not milled deeper than to the setpoint milling depth and/or that the milling drum is not damaged by lowering it too quickly into the ground.

Finally, another essential aspect of the present invention relates to a method of compensating for ground unevenness for a construction machine, in particular for a ground milling machine, traveling over such ground unevenness, particularly for a construction machine as defined above. With reference to the design and arrangement of the device components described below for implementation of the method according to the present invention, reference is also made, in particular, to the above description.

The method according to the present invention firstly consists in registering the weight force value applied to at least one actuator of at least one lifting column of at least one transportation means, by means of a weight force measuring device. In this context, reference is substantially made to the above description. The registered weight force value taken is subsequently transmitted to the control device. The weight force measuring device consists, in particular, of at least one weight force sensor adapted to provide precise monitoring of weight force. The registration and dispatch of weight force values to the control device is carried out continuously or at least at regular intervals, in order to provide the control device with a constant supply of current weight force values, particularly when the ground milling machine is in operation mode.

The method according to the present invention also makes provision for setting a setpoint weight force value for at least one actuator of a lifting column of at least one transportation means, in which the machine frame is set in the setpoint position. The setpoint position is that position of the machine frame that can be continuously defined as the practical set position thereof. The setpoint weight force value represents the weight force value by means of which the control device effects approximation to the setpoint position according to the further method steps for the purpose of maintaining the ground milling machine in a tip-resistant and in particular setpoint position, even when moving over uneven ground, for example, a milled edge. The setpoint weight force value is therefore a reference value to which the method steps below are oriented. The setpoint weight force value may be set manually or automatically.

To implement the method according to the present invention, provision is also made for the weight force value applied to the actuator to be monitored while the construction machine is in motion. In other words, the weight force measuring device will continue to transmit current weight force values to the control device while the construction machine continues to move. This includes transfer at predefined, preferably regular, intervals. According to the present invention, such actual weight force values, that are equivalent to the respective weight force value currently determined by the weight force measuring device, are compared with the setpoint weight force value by the control device.

During the final and crucial operational step of the method according to the present invention, any deviation between the actual weight force value and the setpoint weight force value that occurs and is registered by the control device results in an adjustment of the lifting columns of the front transportation means and/or the rear transportation means and/or the right transportation means and/or the left transportation means in the direction of the setpoint weight force value by way of separate activation of the actuators by means of the control device. An adjustment of the lifting columns in the direction toward the setpoint weight force value thus means that the adjustment movement of the lifting columns triggered by the control device is controlled in such a way that the actual weight force value approaches the setpoint weight force value. This means, for example, that when the ground milling machine shows an increased actual weight force value on the front right-hand lifting column, the control device triggers an adjustment movement of the front right-hand and front left-hand lifting columns in such a way that the actual weight force value approaches the setpoint weight force value representative of the setpoint position.

The method according to the present invention makes provision for a setpoint weight force value to be defined for at least one actuator of a pair of transportation means (in particular, for a pair of actuators for which the implementation of the above method is intended). However, in order to make it possible to compensate at a particularly high level for fluctuations in, and/or displacement of, weight or for fluctuations in, and/or displacement of, weight force that may occur, for example, during operation of the construction machine due, for example, to the consumption of fuel or water, or for similar reasons occurring during operation, it is preferable, according to the present invention, to determine the setpoint weight force value in the form of a setpoint weight force value quotient from two setpoint weight force values of two actuators of a pair of transportation means as reference factor for the adjustment movements of the actuators triggered by the control device and to define this as a reference value. In this embodiment of the present invention, the weight force value ratio relating to the actuators of a pair of front and/or rear transportation means and/or right and/or left transportation means is therefore set as a reference value for the control device. Accordingly, such a refinement of the method according to the present invention involves comparison and adjustment with respect to the setpoint weight force value quotient. An ensuing advantage is that changes in weight force values equally affecting both actuators of a pair of front and/or rear transportation means and/or right and/or left transportation means have no effect on the adjusting movements carried out by the control device. In other words, filtering of changes in weight force values specific to tilting movements is therefore achieved, with the result that such development of the method according to the present invention improves particularly reliably the tipping resistance of the construction machine. It is self-evident that in such a refinement the weight force measuring device must be designed in such a manner that registration and monitoring of weight force values is possible at both actuators of a pair of transportation means. In particular, a weight force sensor is provided, for example, for registration of weight force in an actuator for each lifting column of a pair of transportation means.

Additionally, or alternatively, it is further preferred, for the reasons described above, that a corrective function be carried out by the control device for the purpose of carrying out the method according to the present invention in such a way that a synchronization of the setpoint weight force value or the setpoint weight force value quotient according to at least one signal of at least one of the following sensors is carried out: the water level sensor, the fuel level sensor, the tilt sensor, and the position sensor for detection of the position of the at least one material conveyor device. The tilt sensor, for example, serves to determine the degree of tilt of the machine frame along the longitudinal axis of the construction machine. In this respect, reference is also made, in particular, to previous description concerning the construction machine according to the present invention. Such methods facilitate registration and appropriate compensation of, for example, changes in mass of the entire construction machine, for example, due to fuel consumption. In practical terms this means, for example, that the entire vehicle, becoming lighter due to fuel consumption and/or water consumption, necessarily results in a reduction of the total weight force bearing on the lifting columns of the construction machine. Such changes can at least be indirectly monitored and registered by means of the appropriate sensors. In particular, the control device would then, for example, also lower the setpoint weight force value(s), in particular taking into account changes in weight force distribution over the entire construction machine. For practical purposes, use may be made, for example, of empirically calculated reference values.

For the purpose of carrying out the method according to the present invention, it is advantageous to register the weight force at points of like function when determining the weight force values on both actuators of a pair of transportation means. The weight force values thus registered are then directly comparable with each other in terms of time and quantity.

BRIEF DESCRIPTION OF THE DRAWINGS

The present invention is explained in detail below with reference to the exemplary embodiments shown in the figures. In the schematic figures.

Like components are identified in the drawings by like reference numerals, but not every recurring component is shown separately in the figures.

DETAILED DESCRIPTION OF THE INVENTION

Figure 1:
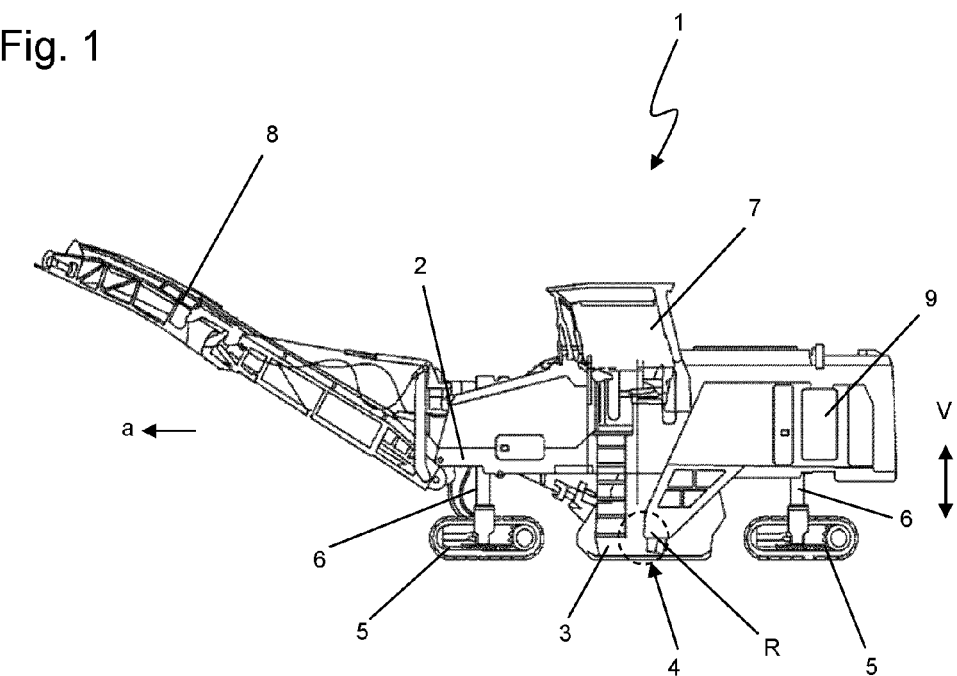
FIG. 1 is a side view of a ground milling machine, in particular a road cold milling machine.

FIG. 1 shows a generic construction machine, in particular a road cold milling machine 1. Essential elements of the road milling machine 1 are a machine frame 2, a milling drum 4 (indicated by dashed lines) disposed within a milling drum box 3, a number of transportation means 5, in this case crawler tracks connected to the machine frame 2 by means of lifting columns 6 and supporting the ground milling machine 1, an operator platform 7, a front conveyor belt 8, and a drive device 9. In working operation, the ground milling machine 1 moves in the direction of advance a across the ground to be milled, whilst the milling drum 4, rotating about an axis of rotation R extending horizontally and transversely to the direction of advance, engages into the ground and mills the same by means of milling tools, which are not shown in detail, in a manner known in the prior art.

Figure 2:
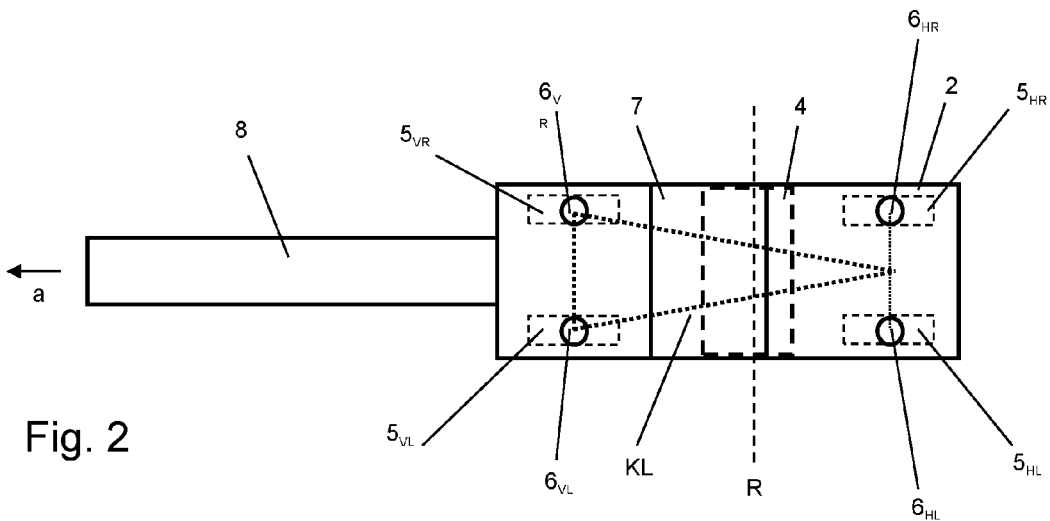
FIG. 2 is a top view of the ground milling machine of FIG. 1.

FIG. 2 illustrates the basic configuration of the ground milling machine 1 by way of a schematic top view. Overall, the ground milling machine 1 thus comprises a pair of front transportation means $5_{VR}$ and $5_{VL}$, respectively connected to the machine frame 2 via one of the lifting columns $6_{VR}$ or $6_{VL}$. Additionally, a pair of rear transportation means $5_{HR}$ and $5_{HL}$ is comprised, connected to the machine frame via the lifting columns $6_{HR}$ and $6_{HL}$. In this case, "H" and "V" identify the placement in the forward direction a of the ground milling machine 1 and signify "rear" and "front", "R" and "L" identify the side of the ground milling machine 1 as seen in the forward direction and signify "right" and "left".

During working operation of the ground milling machine 1, two fundamental challenges are presented to the machine operator in regard to the positional stability of the ground milling machine 1. On the one hand, milling of the ground to a predefined and controlled milling depth ("leveling") is desired, for example, for the purpose of ensuring sufficient removal of ground material and to make sure, if necessary, that no damage is caused to the deeper layers of the road bed. On the other hand, such ground milling machines tend to tilt comparatively easily due to their high center of gravity, particularly when traveling over obstacles on the ground such as milled edges. In order to increase the tipping resistance of such ground milling machines 1, so-called "pendular oscillation" is applied, this providing counteracting height adjustment of the pair of front transportation means $5_{VR}$ and $5_{VL}$ and of the rear transportation means $5_{HR}$ and $5_{HR}$ and left transport devices $5_{VL}$ and $5_{HL}$ and right transport devices $5_{VR}$ and $5_{HR}$ in the manner of a pendular axle, consequently and at least in part compensating for ground unevenness relatively to the machine frame 2. To this effect, the lifting columns 6 are height-adjustable in the vertical direction V or adjustable in the vertical direction. For this purpose, each lifting column 6 comprises an actuator 10 in the form of a double-acting hydraulic cylinder, the structure and functionality of which are specified in more detail in FIGS. 4a to 4c. As further specified below, the present system allows for independent activation of each of the lifting columns 6. However, provision may additionally be made, for example, for the lifting columns to be controlled interdependently, for example, in pairs. The realization of a virtual pendular axle is thus also possible, as illustrated, for example, in FIG. 2 for the two rear lifting columns $6_{HL}$ and $6_{HR}$. The tilt lines KL of the three-way oscillation thus obtained that provide the borderline for the machine center of gravity in the horizontal plane to provide stability of the machine can thus be quickly altered, for example, to four-way oscillation, by means of appropriate adaptation of the control device.

Figures 3, 4A, 4B, 4C:
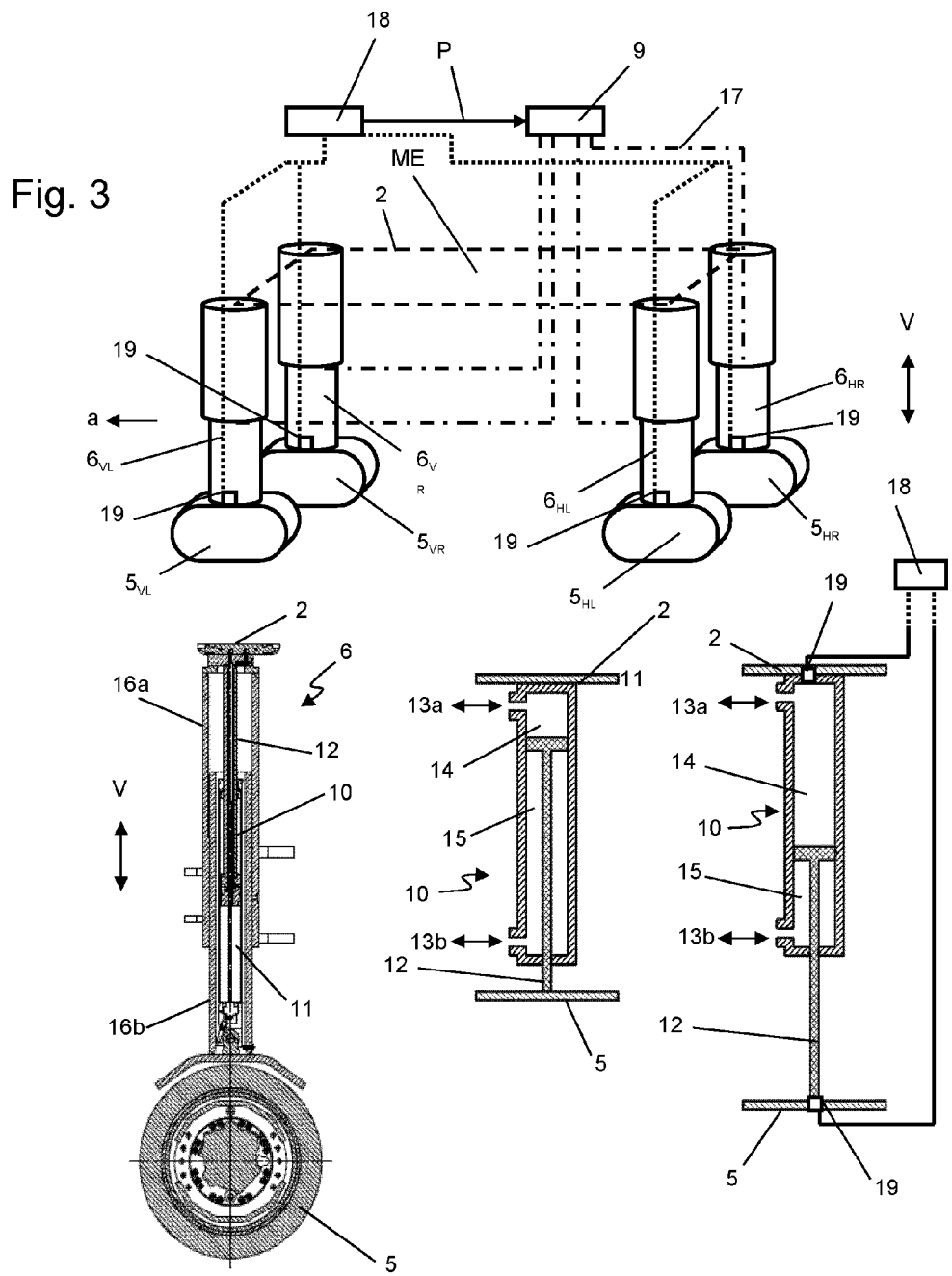
FIG. 3 is a schematic and greatly simplified view of the machine frame together with transportation means and lifting columns of the ground milling machine of FIGS. 1 and 2.
FIGS. 4a-4c are a longitudinal cross-sectional view through a lifting column (FIG. 4a) and illustration of various operating modes (FIGS. 4b and 4c)

FIG. 3 clarifies the fundamental functionality of the overall transportation unit of the ground milling machine 1. The machine frame 2 is indicated here by dashed lines at a horizontally positioned machine frame level ME, extending parallel to the horizontal ground in the present example. The drive device 9, for example, an internal combustion engine powering a hydraulic pump of an appropriate hydraulic supply system, is provided for the purpose of driving the height adjustment. For this purpose, the drive device 9 is fluidly connected by means of appropriate hydraulic lines 17 (shown as dash-dot lines) to each of the actuators 10 in the form of a hydraulic cylinder of the lifting columns 6. The coordination of the adjustment movement of the actuators 10 and therefore of the lifting columns 6 is carried out by means of a control device 18 connected to weight force measuring devices 19. The weight force measuring device 19 may, for example, be a weight force sensor such as a load cell. Such a weight force sensor may particularly include a strain gauge or a piezoelectric element. By means of the weight force measuring devices 19, a weight force value may be detected which is representative of the weight force being applied to respective transportation means. In the case that one of such weight force measuring devices is allocated to each of the four transportation means, thus the current weight force distribution of the machine weight to the individual transportation means 5 may be determined and monitored. Here, it is essential that this does not depend on the exact determination of the actual weight force but mainly on the weight force distribution or the detection of weight force changes. The individual weight force measuring devices 19 are connected to the control device 18 via signal lines, shown with dashed lines in FIG. 3. Furthermore, the control device 18 is connected to the drive device 9 via the line P for the purpose of transferring control signals. It is further essential that the control device 18 controls the actuators 10 preferably in pairs, according to the present invention, at least during travelling operation, with the result that, for example, an adjustment movement of the lifting column $6_{VL}$ also triggers an adjustment movement of the lifting column $6_{VR}$ but not necessarily an adjustment movement of the lifting columns $6_{HL}$ or $6_{HR}$. In addition or as an alternative, pairing may also be provided between the lifting columns $6_{VL}$ and $6_{HL}$ and/or $6_{VR}$ and $6_{HR}$. The control device 18 further controls each of the actuators 10 individually and independently of one another. This means that the control device 18 activates both lifting columns 6 or actuators 10 of each pair independently of each other to achieve paired control.

For further clarification, the basic structure of possible lifting columns is depicted as an example in FIGS. 4a-4c. In this regard, FIG. 4 is a cross-sectional view through one lifting column 6 in a vertical direction along its longitudinal middle axis. An essential element of each lifting column 6 in this regard is, in particular, an actuator 10, by means of which the adjustment force is applied. In this particular exemplary embodiment, the actuator 10 is a hydraulic cylinder piston unit having a hydraulic cylinder 11 and a piston 12 guided for linear displacement within the hydraulic cylinder 11. The actuator 10 is shielded from the outside against external influences in known manner by means of a pair of sleeves 16a, 16b.

FIGS. 4b and 4c show schematically the functionality of the actuator 10 in more detail, in which FIG. 4b relates to the low position, more specifically the maximum retracted state, and FIG. 4c relates to the high position, more specifically the maximum extended state, of the lifting column 6. FIGS. 4b and 4c relate to a reverse arrangement of cylinder 11 and piston 12. The hydraulic cylinder 11 contains two inlet and outlet lines 13a and 13b for the discharge and supply of the hydraulic fluid from/to the internal chamber 14 on the piston side or the internal chamber 15 on the rod side, as indicated by means of the corresponding arrows. In particular, this consequently involves so-called double-acting working cylinders.

Figure 5:
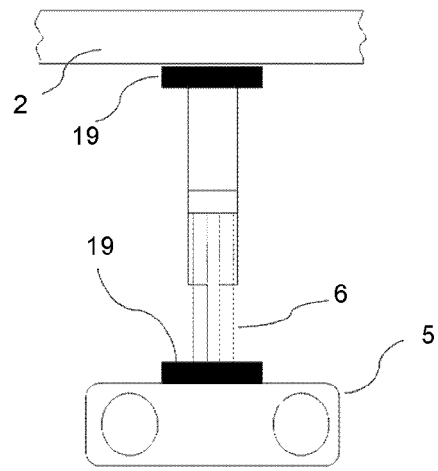
FIG. 5 is a schematic side view regarding the positioning of the weight force measuring device.

Particularly, FIG. 4c illustrates further that the weight force sensor of the weight force measuring device 19 is preferably arranged above the lifting column between the lifting column and the machine frame or below the lifting column between the transportation means and the lifting column. The difference between these two arrangement alternatives lies essentially with the fact that the lifting column weight is also detected when the measuring device is arranged below the column whereas the weight of the lifting column does not contribute to the detected weight force value in the case that the weight force measuring device is arranged above the lifting column. It may also be provided that in each case one weight force measuring sensor is arranged both above and below the lifting column, for example, for achieving a certain redundancy here. This is also further explained in FIG. 5, which in an exemplary manner is a schematic side view of a lifting column unit of the road milling machine 1. The machine frame 2 rests on the lifting columns via the upper weight force sensor 19 in the vertical direction. Thus, the weight force sensor 19 in this embodiment is arranged between the head region of the lifting column and the machine frame 2. In an additional or alternative refinement of the present invention, a further weight force sensor is arranged in the vertical direction between the base region of the lifting column and the transportation means 5. The latter sensor thus detects a weight force value including the weight force of the lifting column.

Figure 6:
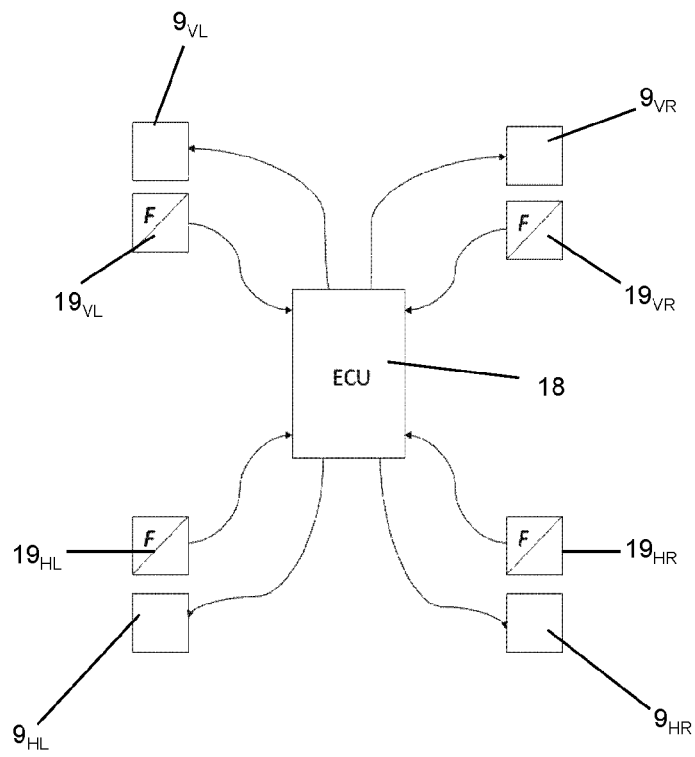
FIG. 6 is a schematic view regarding the interplay of the weight force measuring device, the control device and actuators.

A criterion for the implementation of the pendular function of the pair of front and/or rear transportation means 5 according to the present invention is the basic idea of making use of the changes in weight force that occur whilst driving over an obstruction, which changes particularly present themselves as a reference criterion for the implementation of the adjustment movement of the actuators 10. One possible structure of such a control assembly is further schematically illustrated in FIG. 6. The control assembly includes in each case one weight force measuring device 19 allocated to each transportation means 5, which devices in each case detect a weight force value and transmit said value to the control device 18. The detection of the weight force is preferably effected continuously so that weight force changes or changes in the weight force distribution, which are to be traced back to a change of the position of the road milling machine 1, for example, are determined by the control device 18. Based on said detected weight force changes the control device 18 controls the actuators 10, particularly lifting columns, or the respective drives 9 in such a way that the weight force distribution approaches back to the starting value or a "tare distribution". As a result, the control device 18 counteracts level changes of the machine and particularly prevents that the machine gets into instable positions, for example, when moving over obstacles. Thus, the control device 18 controls the extension position of the actuators depending on the weight force distribution detected by the weight force distribution devices.

Figure 7:
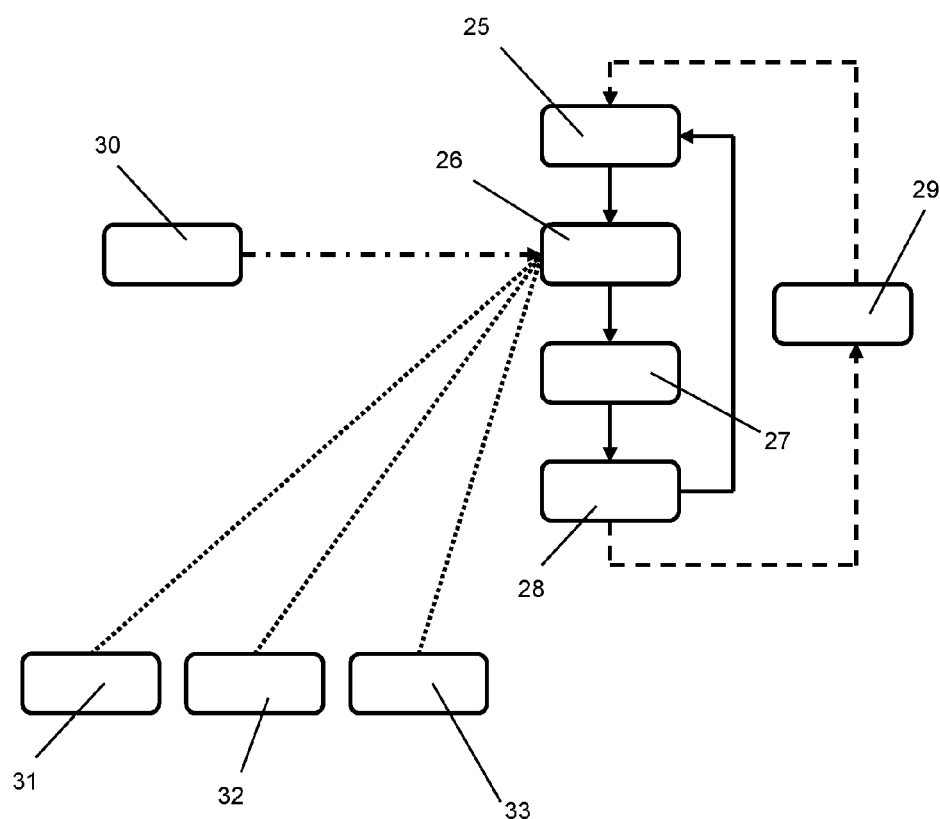
FIG. 7 is a flow chart illustrating the method according to the present invention.

FIG. 7 demonstrates the main steps for carrying out the method according to the present invention. In this method, the registration of a weight force value F0 applied to at least one actuator 10 of a lifting column 6 of at least one transportation means 5 initially takes place during step 25 by means of the weight force measuring device 19, in particular a weight force sensor 19 (top and/or bottom), following which said weight force value is transmitted to the control device 18. In this regard, it is ideal if, during this step 25, at least one weight force value is measured per lifting column 6 of a pair of front transportation means or rear transportation means or right transportation means or left transportation means and particularly if one weight force value is detected at each transportation means, particularly lifting column, and transmitted to the control device 18. With reference to the weight force value thus obtained, a setpoint weight force value of at least the one actuator 10 of the lifting column 6 of at least one transportation means 5 is determined during the subsequent step 26 by means of the control device 18 for the machine frame 2 being in its setpoint position. Such a setpoint weight force value serves as a reference value for the control method described in greater detail below, by means of which the weight force loads on the lifting columns 6 take place due to deviations from the setpoint position of the machine frame 2 for the purpose of balancing the machine frame 2. Such a step 26 can take place continuously but also, for example, by way of manual activation and/or when the construction machine 1, etc. starts operation. As particularly described in FIG. 6, the detection of the weight force values according to step 25 is preferably performed simultaneously at the respective actuators of a pair of transportation means and particularly at locations of like function and very particularly at locations of like functions of all actuators of the transportation means. That means that the weight force measurement is effected, for example, for both and particularly for all actuators 10 ideally at the side of the machine frame or the side of the overall transportation unit or on both sides at the same time.

During the entire travelling and working operation, provision is now made, according to step 27, for monitoring of the weight force value F of the ground milling machine 1 as applied to the relevant actuator 10. During this process, the registered actual weight force values $F_{1(top)}/F_{2(bottom)}$ applied to the actuator are continuously compared with the setpoint weight force value F0 according to step 28 by means of the control device 18. In the event of deviations $\Delta F$ occurring between the actual weight force value $F_1/F_2$ and the setpoint weight force value F0, the control device 18 controls an adjustment of at least one pair of the lifting columns of the front transportation means and/or the rear transportation means and/or the right transportation means and/or the left transportation means in the direction of the setpoint weight force value F0 by way of separate actuation of the actuators by the control device. Weight force changes thus serve as a reference for stabilization of the machine frame 2 of the ground milling machine 1 in the direction of the setpoint position for the purpose of ensuring an optimum and practical weight distribution of the machine weight to the transportation means and for the purpose of counteracting tilting of the ground milling machine 1 when driving over obstructions. Such reverse adjustment is carried out during step 29 and, ideally, continues until the actual weight force value $F_1/F_2$ has been adjusted to the setpoint weight force value F0. This process is repeated continuously during the travelling and working operation. Provision is advantageously made for the step 29 to take place only when a differential weight force threshold value $\Delta F$ is exceeded so as to prevent the regulation process from being triggered by minute changes in weight force. Provision is consequently made in such a refinement of the method according to the present invention for the control device 18 also to monitor exceedance and understepping of such predefined weight force threshold values.

Monitoring of the weight force on the pair of rear or front or right or left transportation means preferably takes place not only with respect to one actuator, but also with respect to both actuators of the respective pair of front and/or rear and/or right and/or left transportation means. Finally, it is very particularly preferred that the weight force detection is performed at each actuator for transportation means. In this regard, it is advisable not to refer to a single setpoint weight force value, but to form a setpoint weight force value quotient or a weight distribution as a reference value for the steps 26 et seq., which is monitored by the control device 18 according to the steps 27, 28, and 29 and used as a reference value for the regulating process described above. The formation of the quotient is indicated in FIG. 8 by the reference numeral 30.

Apart from aspects concerning structure and design, the weight force distribution of the ground milling machine 1 against the actuators 10 is particularly important for the weight force values applied to the individual actuators 10. Significant changes may, however, occur in the operational mode, for example, due to the consumption of water and/or fuel and/or leveling operations and/or the position of the at least one material conveyor device of the ground milling machine 1. According to the steps 31 to 33, the method according to the present invention therefore ideally encompasses at least one or more corrective functions that correct the changes in weight force distribution caused by such factors from the setpoint weight force values or the setpoint weight force value quotients. To this end, provision is made for the transmission of the water level value to be carried out by means of a water level sensor as shown in step 31, for the transmission of the fuel level value to be carried out by means of a fuel level sensor as shown in step 32, for the transmission of the degree of tilt along the longitudinal axis and/or transverse axis of the ground milling machine to be carried out by means of a tilt sensor 33 and the transmission of the position of the at least one material conveyor device by a position sensor 34.

Figure 8A:
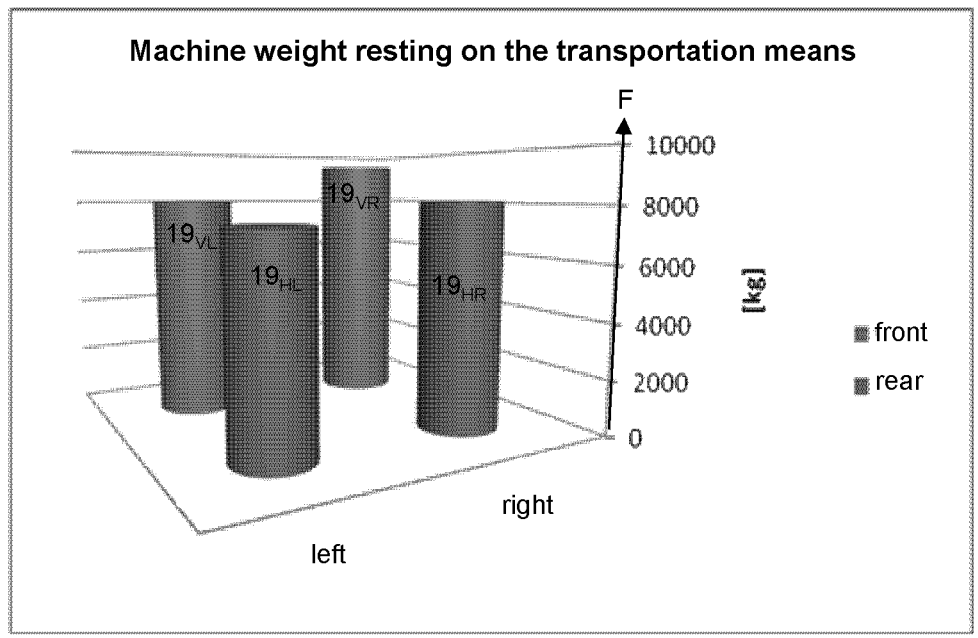
FIGS. 8a and 8b are weight force distribution diagrams, FIG. 8a with an uneven distribution and FIG. 8b with setpoint distribution.
Figure 8B:
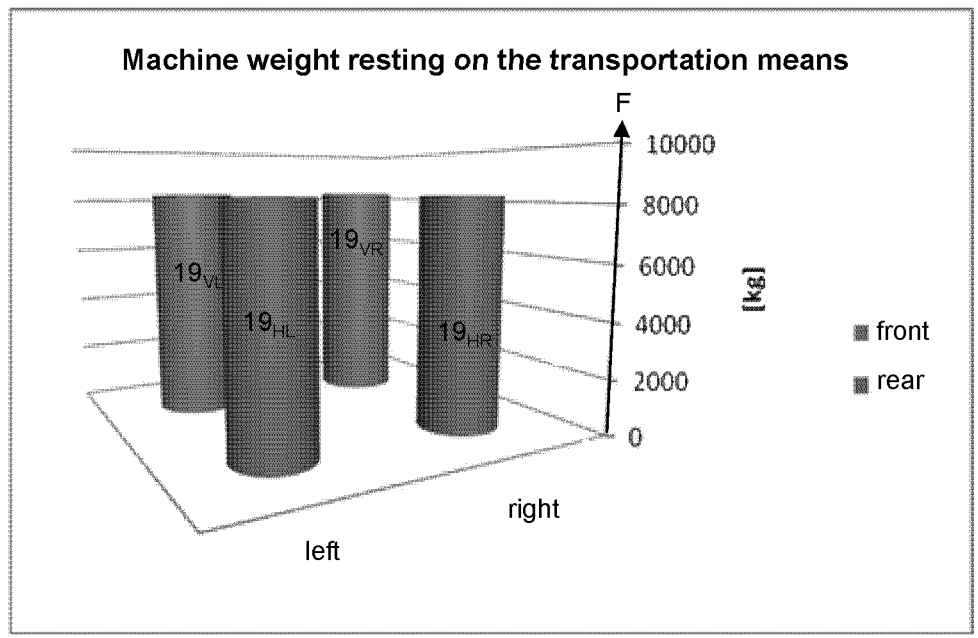

FIGS. 8*a* and 8*b* again illustrate an aspect of the present invention. Here, FIG. 8*b* relates to a position of the machine in the setpoint position. In the present exemplary embodiment, the weight force of the machine is evenly distributed over the four transportation means 5. Based on said distribution, now a disturbance of said distribution occurs, for example, in that the machine moves into a milling bed over a milled edge with the front right side thereof and thus tips to the front-right side. Said change of the level of the machine immediately results in a change of the weight distribution of the machine, as indicated in FIG. 8*a*. The control device registers these changes and controls the actuators or the drives thereof such that the overall system approaches back toward the starting position according to FIG. 8*b*. In the present case, this is achieved by extending the actuator a the front-right side and a retraction of the actuator at the rear left side. It is thus essential that the control of the extension position of the actuators 10 is performed by the control device 18 according to the transmitted weight force values or the determined weight force distribution. Monitoring of and ensuring a stable machine position is thus performed by means of the weight force values or the determined weight force distribution.

While the present invention has been illustrated by description of various embodiments and while those embodiments have been described in considerable detail, it is not the intention of Applicants to restrict or in any way limit the scope of the appended claims to such details. Additional advantages and modifications will readily appear to those skilled in the art. The present invention in its broader aspects is therefore not limited to the specific details and illustrative examples shown and described. Accordingly, departures may be made from such details without departing from the spirit or scope of Applicants' invention.

What is claimed is:

1. A construction machine, comprising:
a machine frame;
a pair of front transportation devices ($5_{VL}$, $5_{VR}$) and a pair of rear transportation devices ($5_{HL}$, $5_{HR}$), at least one of the pairs of front and rear transportation devices (5) being connected to the machine frame via lifting columns each of which comprises an actuator;
a drive device for independent propulsion of the actuators of the lifting columns; and
a control device configured to control a lift adjustment of the lifting columns via the actuators, wherein
a weight force measuring device is allocated to at least one actuator of a pair of front or rear or right or left transportation devices ($5_{VL}$, $5_{VR}$; $5_{HL}$, $5_{HR}$) which is configured for determining the weight force value (F) applied to said at least one actuator, and
said control device controls the set position of the actuators of said pair of transportation devices ($5_{VL}$, $5_{VR}$; $5_{HL}$, $5_{HR}$) according to the weight force values (F) determined by the weight force measuring device,
the control device being configured in such a manner that, starting from a setpoint position of the machine frame, in which a setpoint weight force value ($F_0$) is present, the control device controls two actuators of said pair of front and/or rear transportation devices and/or of right transportation devices and/or left transportation devices ($5_{VL}$, $5_{VR}$; $5_{HL}$, $5_{HR}$) independently of each other when weight force changes occur during the travelling operation so that the actual weight force value approaches the setpoint weight force value via a lift adjustment of the actuators.

2. The construction machine according to claim 1, wherein each of said transportation devices ($5_{VL}$, $5_{VR}$; $5_{HL}$, $5_{HR}$) is connected to said machine frame via a respective lifting column ($6_{VL}$, $6_{VR}$; $6_{HL}$, $6_{HR}$) having an actuator, and that said control device controls each of said actuators separately.

3. The construction machine according to claim 1, wherein said actuators are hydraulic cylinders, that a hydraulic supply system comprising a hydraulic pump is present, that for each lifting column ($6_{VL}$, $6_{VR}$; $6_{HL}$, $6_{HR}$) valves are provided which are configured for hydraulic fluid inlet and outlet and are controlled independently of each other by the control device, and that a respective weight force measuring device for determining the weight force (F) applied to the hydraulic cylinder is allocated to each hydraulic cylinder.

4. The construction machine according to claim 3, wherein the hydraulic cylinders are working cylinders acting in both directions.

5. The construction machine according to claim 1, wherein the weight force measuring device is configured in such a way that it detects the weight force values on the side of the machine frame and/or on the side of the transportation devices.

6. The construction machine according to claim 1, wherein the control device is configured in such a way that, with the machine frame being in the setpoint position in relation to a pair of transportation devices ($5_{VL}$, $5_{VR}$; $5_{HL}$, $5_{HR}$), said control device calculates a setpoint weight force value ($F_0$) for each actuator and a setpoint weight force value quotient and controls two actuators independently of each other in the case of weight force changes ($\Delta F$) occurring during operation so that an actual weight force value quotient of the actuators approaches a setpoint weight force value quotient via a lift adjustment of the actuators.

7. The construction machine according to claim 1, wherein at least one of the following sensors is provided, which transmits sensor information to the control device, and that the control device is configured in such a manner that the sensor information is taken into consideration for the control of the actuators:
a filling level sensor for a fuel tank;
a filling level sensor for a water tank;
a tilt sensor for determining a degree of tilt of the machine frame along the longitudinal axis or the transverse axis of the construction machine; and/or
a position sensor for determining the position of the material conveyor device.

8. The construction machine according to claim 1, wherein the construction machine comprises a device for determination of a vertical level of the construction machine in the setpoint position.

9. The construction machine according to claim 1, wherein the construction machine comprises an automatic milling starter controlled by the control device.

10. A method for weight distribution of the machine weight to the transportation devices for a construction machine, according to claim 1, comprising the steps of:
a) registering the weight force value applied to an actuator of at least one lifting column of at least one transportation device by means of a weight force measuring device and transmitting the weight force value to a control device;
b) setting a setpoint weight force value for at least one actuator of a lifting column of at least one transportation device when the machine frame is in the setpoint position;
c) monitoring the weight force value applied to the actuator;
d) comparing an actual weight force value with the setpoint weight force value by means of the control device; and
e) upon deviation between the actual weight force value and the setpoint weight force value: adjusting the lifting columns of the front and/or rear transportation devices and/or right and/or left transportation devices in the direction of the setpoint weight force value by way of separate controlling of the actuators via the control device.

11. The method according to claim 10, wherein in step b) a setpoint weight force value quotient is determined from two setpoint weight force values of two actuators of a pair of transportation devices; and
in steps d) and e) comparison and adjustment are carried out with respect to the setpoint weight force value quotient.

12. The method according to claim 10, wherein the control device carries out a corrective function in such a way that synchronization of the setpoint weight force value or the setpoint weight force value quotient depending on a signal of at least one of the following sensors is performed: water level sensor, fuel level sensor, tilt sensor, and/or position sensor.

13. The method according to claim 10, wherein the determination of the weight force values applied to the actuators of a pair of transportation devices takes place simultaneously and at functionally similar locations.

14. The construction machine according to claim 1, wherein the construction machine comprises one of a road milling machine or a ground milling machine.

* * * * *